United States Patent
Matsumoto

(10) Patent No.: US 8,531,496 B2
(45) Date of Patent: Sep. 10, 2013

(54) IMAGE FORMING APPARATUS HAVING A PLURALITY OF LASER ELEMENTS

(75) Inventor: Kazutaka Matsumoto, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 87 days.

(21) Appl. No.: 13/224,419

(22) Filed: Sep. 2, 2011

(65) Prior Publication Data
US 2012/0056967 A1 Mar. 8, 2012

(30) Foreign Application Priority Data
Sep. 6, 2010 (JP) .................................. 2010-198739

(51) Int. Cl.
*B41J 2/45* (2006.01)
(52) U.S. Cl.
USPC ......................................................... 347/238
(58) Field of Classification Search
USPC ................. 347/229, 233–235, 238, 240–242, 347/245, 248–257
See application file for complete search history.

(56) References Cited

U.S. PATENT DOCUMENTS

| | | | |
|---|---|---|---|
| 5,610,647 A | 3/1997 | Takada | |
| 7,206,012 B2 * | 4/2007 | Cook et al. | 347/234 |
| 7,593,028 B2 * | 9/2009 | Kimura | 347/234 |
| 2007/0046769 A1 * | 3/2007 | Park et al. | 347/235 |
| 2007/0206259 A1 | 9/2007 | Nakajima | |

FOREIGN PATENT DOCUMENTS

| | | |
|---|---|---|
| JP | 8-254928 A | 10/1996 |
| JP | 2001-4942 A | 1/2001 |
| JP | 2001-228382 A | 8/2001 |
| JP | 2003-94722 A | 4/2003 |
| JP | 2004-299149 A | 10/2004 |
| JP | 2007-233235 A | 9/2007 |

* cited by examiner

*Primary Examiner* — Hai C Pham
(74) *Attorney, Agent, or Firm* — Birch, Stewart, Kolasch & Birch, LLP

(57) ABSTRACT

An image forming apparatus has a speed range showing image forming capability per unit time that is determined in advance, and is settable to either a model set at a relatively low-speed range or a model set at a relatively high-speed range. Then, the arrangement of the laser elements is differentiated between a low-speed machine and a high-speed machine each other. Even when timing of writing for the high-speed machine is applied to the arrangement of the laser elements for the low-speed machine to write in an image, the image is not able to be written successfully, and resulting in an image which is displaced vertically.

9 Claims, 13 Drawing Sheets

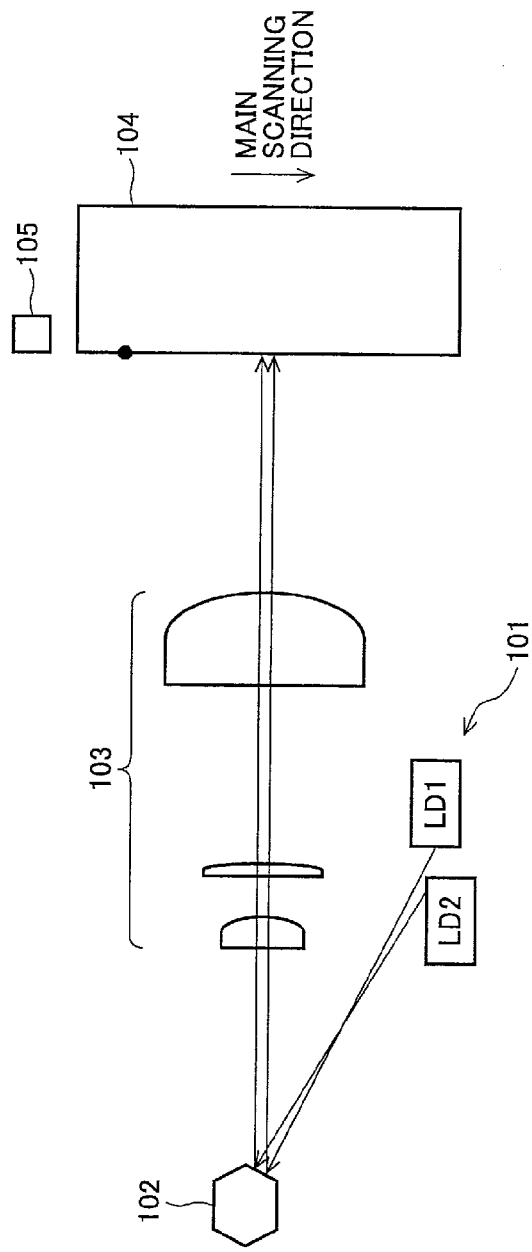
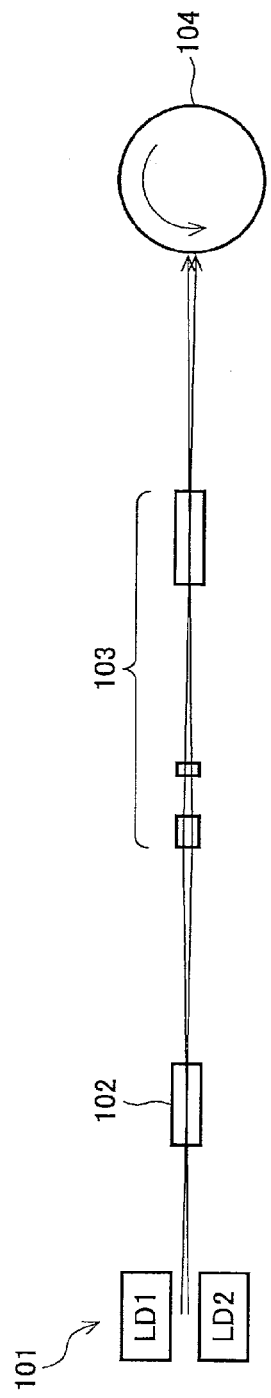

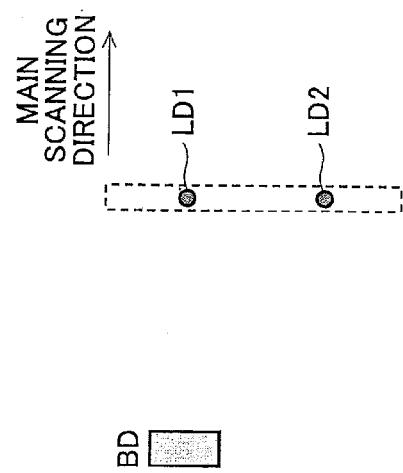
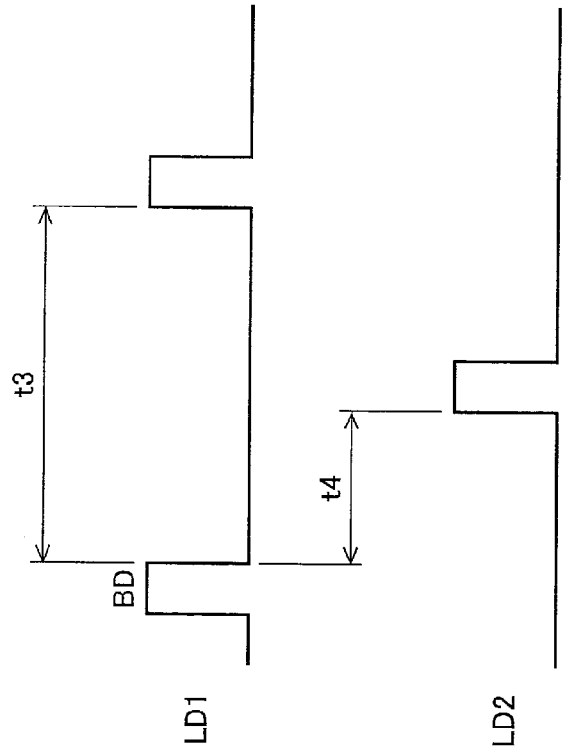
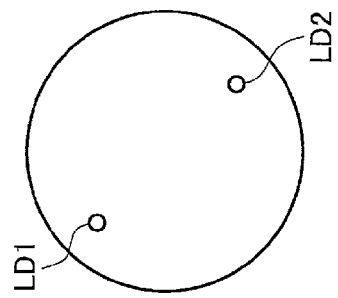

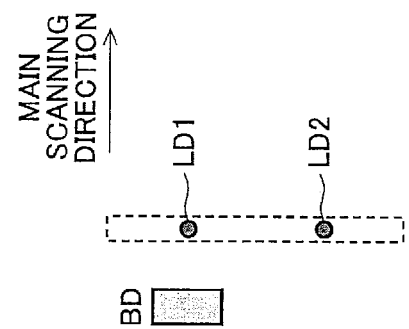
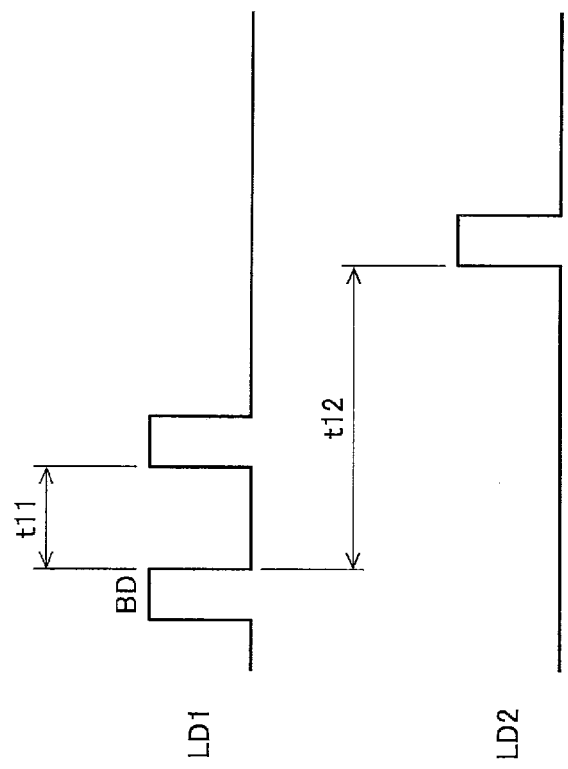
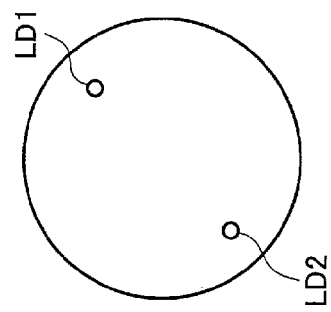

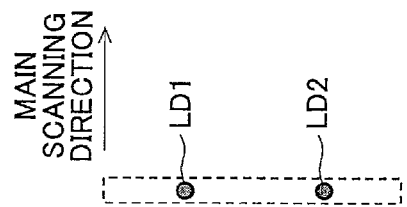
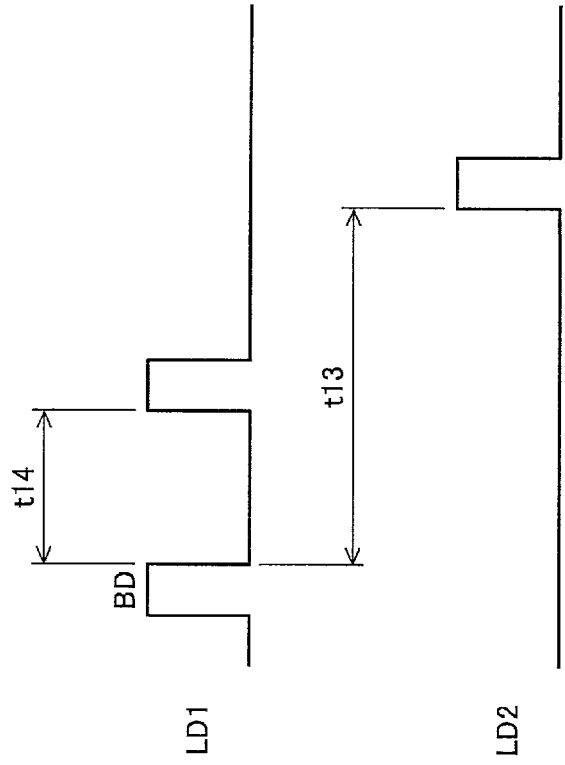
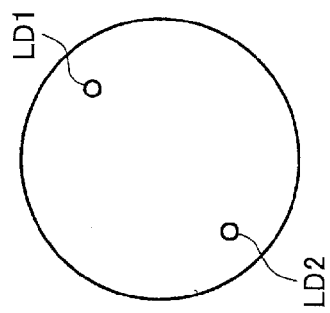

IMAGE FORMING APPARATUS HAVING A PLURALITY OF LASER ELEMENTS

CROSS-NOTING PARAGRAPH

This non-provisional application claims priority under 35 U.S.C. §119(a) on Patent Application No. 2010-198739 filed in JAPAN on Sep. 6, 2010, the entire contents of which are hereby incorporated herein by reference.

BACKGROUND OF THE INVENTION

1. Field of the Invention

The present invention relates to an image forming apparatus such as a copier and a multi-functional peripheral, and particularly relates to an image forming apparatus provided with an optical scanning device which scans a scanning object (photoreceptor drum) with a light beam.

2. Description of the Related Art

An image forming apparatus which scans a photoreceptor by a laser beam to expose has been known as an electrophotographic image forming apparatus. As a mechanism for scanning by a laser beam, it is common to scan the photoreceptor by reflecting a laser beam emitted from a laser light source provided at a fixed position by a polygon mirror and deflecting the laser beam in a predetermined direction according to variation of a reflection angle associated with a rotation of the polygon mirror.

An image forming apparatus which performs image formation using a multi-laser beam for high-speed writing and high accuracy has been known for an image forming apparatus using such a laser scanning optical system. Further, an image forming apparatus which has a plurality of speed ranges (the number of recording sheets that are printable per minute) has been known.

As to the image forming apparatus provided with the scanning optical system by a multi-laser beam, for example, Japanese Laid-Open Patent Publication No. 2001-228382 discloses a method of adjusting a multibeam light source unit which aims to easily and rapidly perform mounting adjustment of a multibeam laser element in the multibeam light source unit. Here, the multibeam light source unit provided with the multibeam laser element with a plurality of light emitting points that are designed to locate on a virtual straight line that is defined by a notch formed on a stem, and a collimator lens which converts a laser beam emitted from the light emitting point into a parallel pencil are arranged in the scanning optical system with a virtual straight line as a reference. Then, in this case, the mounting adjustment of the multibeam laser element is performed by rotating it around an axis corresponding to an optical axis of the scanning optical system while observing the multibeam element magnified by an enlarging optical device so that displacement which occurs between a direction in which a reference straight line which is planned to be present on the design in the scanning optical system extends and an arrangement direction of the plurality of light emitting points disappears and the both directions are aligned.

Furthermore, Japanese Laid-Open Patent Publication No. 2007-233235 discloses an optical scanning apparatus which aims to form a high quality image without unevenness of concentration, color deviation and color change by adjusting an interval between scanning lines to be even for a scanning frequency and a beam spot interval in a sub-scanning direction of an oscillating mirror that are arbitrarily set. The optical scanning apparatus is provided with light source means having a plurality of light emitting sources, light source driving means which modulates each light emitting source according to pixel information, an oscillating mirror which is supported by a torsion beam as a rotation axis and reciprocates to scan on a surface to be scanned by collectively deflecting a light beam from each light emitting source, and an image formation optical system which forms an image of the light beam from each light emitting source to have a predetermined beam spot interval in the sub-scanning direction on the surface to be scanned. The optical scanning apparatus further includes oscillating mirror driving means which sets a scanning frequency according to a resonance frequency of the oscillating mirror, and pitch adjusting means which adjusts the beam spot interval according to the set scanning frequency of the oscillating mirror.

As described above, the image forming apparatus which performs image formation using a multi-laser beam and has a plurality of speed ranges in one model has been known.

Conventionally, such an image forming apparatus is provided with a skating bit to prevent conversion of the speed range. The skating bit is a data bit which is output from each substrate incorporated into the image forming apparatus for preventing inappropriate conversion, and to notify a CPU for which model the substrate from which the data bit is output is used. The skating bit is output to the CPU as a signal by a voltage value or the like from a predetermined signal line. For example, a skating bit which is different for each of target models is output from the substrate by differentiating an electric hardware configuration for each target model by connecting a predetermined line of the substrate to the ground, by connecting the line to a supply line of a predetermined voltage (for example, 5 V), and the like. With this skating bit, the CPU finds for which model a substrate is used.

The image forming apparatus stores software to control a recording sheet conveyance speed according to each model and information on writing operation timing in one flash ROM to be held, and the CPU uses them by switching the operation timing according to a skating bit output from each substrate.

Some models of image forming apparatuses change an interval between recording sheets without changing a processing speed (speed of a photoreceptor drum) in order to change the speed range shown by, for example, the number of sheets on which image formation is possible to be performed per minute. When the interval between the recording sheets is made smaller, the speed range becomes faster, and when the interval between the recording sheets is made larger, the speed range becomes slower. Thereby, models for a low-speed machine and a high-speed machine are able to be manufactured with basically a same apparatus configuration so as to contribute to expansion of development of the models on the business and the like.

For example, in a case where a malicious user who purchased an image forming apparatus with a low speed range converts a part corresponding to the skating bit of the substrate of the image forming apparatus into that for a high-speed machine from that for the low-speed machine, the image forming apparatus is able to be operated as the high-speed machine.

In a flash ROM of the image forming apparatus, the software and the information on the operation timing to control the conveyance timing of the recording sheet according to all the speed ranges for the high-speed machine and for the low-speed machine are stored as described above, and the CPU of the image forming apparatus thus operates for the high-speed machine when skating bit information for the high-speed machine is obtained from the substrate, while operates for the low-speed machine when the skating bit information for the low-speed machine is obtained. In a case where a malicious user converts the part corresponding to the skating bit of the model for the low-speed machine into that for the high-speed machine, the skating bit for the high-speed machine is output from the substrate and the image forming apparatus provided for the low-speed machine comes to operate as the high-speed machine. Thereby, the low-speed machine is able to be converted into the high-speed machine. This is a so-called state where the skating is discovered.

The conversion of the speed range as described above is an action contrary to an intention of an entity manufacturing and providing image forming apparatuses, and further, allowing the speed range to be converted means that it is possible to modify an inexpensive image forming apparatus for the low-speed machine to the high-speed machine easily, which have been a problem also from an aspect of business profitability of the image forming apparatuses.

The invention of the above-described Japanese Laid-Open Patent Publication No. 2007-233235 adjusts the beam spot interval in the sub-scanning direction according to the variation of the resonance frequencies of the oscillating mirror. Moreover, the invention of the cited reference 1 is made to easily perform the mounting adjustment of the multibeam laser element. These inventions are neither for preventing the conversion of the low-speed machine into the high-speed machine as described above, nor for adjusting the arrangement of the laser element so as to be differentiated between the low-speed machine and the high-speed machine as the present invention.

SUMMARY OF THE INVENTION

An object of the present invention is to provide an image forming apparatus in which arrangement of laser elements emitting a multibeam is differentiated between a low-speed machine and a high-speed machine so that, when conversion of a speed range is performed, distortion of an image is caused, and thus causing the conversion of the speed range not able to be performed substantively.

The object of the present invention is to provide an image forming apparatus comprising a plurality of laser elements and a scanning optical system which scans a photoreceptor by a laser beam emitted from the laser elements, wherein the image forming apparatus has a speed range showing image forming capability per unit time that is determined in advance, and is settable to either a model set at a relatively low-speed range or a model set at a relatively high-speed range, and arrangement of the laser elements of the low-speed model and arrangement of the laser elements of the high-speed model are differentiated from each other.

Another object of the present invention is to provide the image forming apparatus, wherein if the laser elements of the low-speed model and the laser elements of the high-speed model are arranged horizontally in a main scanning direction of the image forming apparatus, the arrangement of the laser elements of the low-speed model and the laser elements of the high-speed model is horizontally symmetric.

Another object of the present invention is to provide the image forming apparatus, wherein if the laser elements of the low-speed model and the laser elements of the high-speed model are arranged vertically in a sub-scanning direction of the image forming apparatus, the arrangement of the laser elements of the low-speed model and the laser elements of the high-speed model is vertically symmetric.

Another object of the present invention is to provide the image forming apparatus, wherein arrangement positions of the laser elements of either one of the low-speed model or the high-speed model corresponds to positions where the laser elements of the other model are rotated 180° around a center point of an arrangement region of the laser elements as a rotation center.

Another object of the present invention is to provide the image forming apparatus, wherein timing of writing of writing image data on the photoreceptor by scanning the photoreceptor by a laser beam is adjusted by software.

Another object of the present invention is to provide the image forming apparatus, wherein timing of writing of writing image data on the photoreceptor by scanning the photoreceptor by a laser beam is adjusted by an FPGA.

BRIEF DESCRIPTION OF THE DRAWINGS

FIG. 1A and FIG. 1B are diagrams for illustrating a schematic configuration and behavior of a scanning light of an image forming apparatus of the present invention;

FIG. 3A to FIG. 3C are another diagrams illustrating a mounting configuration example of laser elements, timing of writing at that time and behavior of an image surface in the image forming apparatus according to the present invention;

FIG. 5A to FIG. 5C are diagrams illustrating another mounting configuration example of laser elements, timing of writing at that time, and behavior of an image surface in the image forming apparatus according to the present invention;

FIG. 7A to FIG. 7C are diagrams showing an arrangement configuration of laser elements, timing of writing, and a state of an image on a photoreceptor image surface when exposed at a timing of a high-speed machine with the configurations of FIG. 5A to FIG. 5C;

DETAILED DESCRIPTION OF THE INVENTION

Figure 2C:
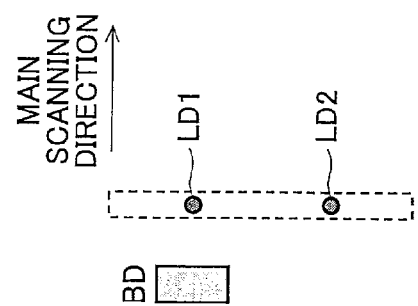
FIG. 2A to FIG. 2C are diagrams illustrating a mounting configuration example of laser elements, timing of writing at that time and behavior of an image surface in the image forming apparatus according to the present invention.

FIG. 1A and FIG. 1B are diagrams for illustrating a schematic configuration and behavior of a scanning light of an image forming apparatus of the present invention, FIG. 1A is a diagram illustrating a laser beam in a main scanning direction of the image forming apparatus, and FIG. 1B is a diagram illustrating a laser beam in a sub-scanning direction of the image forming apparatus. Here, for optical components constituting an optical system, only main elements thereof are shown, and for the behavior of the laser light, detailed description according to an optical component (not-shown) is omitted. Further, optical paths are schematically shown.

A laser emitting portion 101 constitutes a multibeam emitting portion with a plurality of laser elements. Two laser elements (LD1, LD2) are assumed to be provided in this example. Each of the laser elements LD1, LD2 is arranged as being displaced from both the main scanning direction and the sub-scanning direction.

As to the main scanning direction, a laser beam emitted from each of the laser elements LD1, LD2 is made incident on a reflection surface of a polygon mirror 102. The reflection surface of the polygon mirror 102 changes an angle thereof in the main scanning direction associated with a rotation thereof. The laser beam reflected by the polygon mirror 102 receives action by a plurality of f-theta lenses 103 while moving in the main scanning direction at a uniform angular speed, and converted so as to move at a uniform linear speed on a scanning line on the surface of the photoreceptor 104. On the photoreceptor 104, two laser beams are made to be scanned in a state of being displaced in the main scanning direction by a predetermined amount (several tens of micrometer).

Next, as to the sub-scanning direction, a laser beam emitted from each of the laser elements LD1, LD2 almost converges on the reflection surface of the polygon mirror 102 to be reflected, and thereafter passes through the f-theta lenses 103 to irradiate the surface of the photoreceptor 104 in a state of being displaced in the sub-scanning direction by a predetermined amount (several tens of micro-meter).

In this manner, the laser elements LD1, LD2 are arranged as being displaced in the main scanning direction and the sub-scanning direction, respectively, and even on an image surface of the photoreceptor 104, the two laser beams are irradiated with displacement in the main scanning direction and the sub-scanning direction. Thereby, the two laser beams scan in the main scanning direction according to the rotation of the polygon mirror 102 while having the displacement of several tens of micro-meter, for example, in the main scanning direction and the sub-scanning direction.

Furthermore, in a scanning optical system in FIG. 1A and FIG. 1B, a BD (Beam Detect) sensor 105 for generating a reference signal for writing by the laser beam is provided. When the laser beam scans the photoreceptor 104, the laser beam scans a main scanning line periodically. A position at which writing of the scanning line is started should be the same each time the laser beam scans.

The BD sensor 105 outputs a sensor signal according to a reception light amount. Then, a control portion such as a CPU provided in the image forming apparatus generates a synchronization signal (BD signal) for determining a start position of image writing based on the sensor signal from the BD sensor 105.

Specifically, when the reception light amount of the BD sensor 105 is at least more than a light amount necessary to form an electrostatic latent image by exposing the photoreceptor 104 to a laser beam thereof, the BD signal is generated. The BD signal is used as a scanning start reference signal in the main scanning direction, and the writing start position in the main scanning direction of each line is synchronized using the signal as a reference.

In the image forming apparatus with the configuration described above, in an embodiment according to the present invention, it is characterized in that when a low-speed machine and a high-speed machine are configured by changing a setting of the speed range, arrangement of the laser elements emitting the multibeam is differentiated according to the speed range in order to prevent conversion from the low-speed machine into the high-speed machine.

FIG. 2A to FIG. 2C and FIG. 3A to FIG. 3C are diagrams illustrating a mounting configuration example of laser elements, timing of writing at that time and behavior of an image surface in the image forming apparatus according to the present invention.

In the image forming apparatus of the present embodiment, it is assumed that two speed ranges for the low-speed machine and the high-speed machine are able to be set with the same model configuration. The speed range is set by changing a conveyance interval between recording sheets without changing the processing speed (speed of a photoreceptor drum), as described above.

Figure 2B:
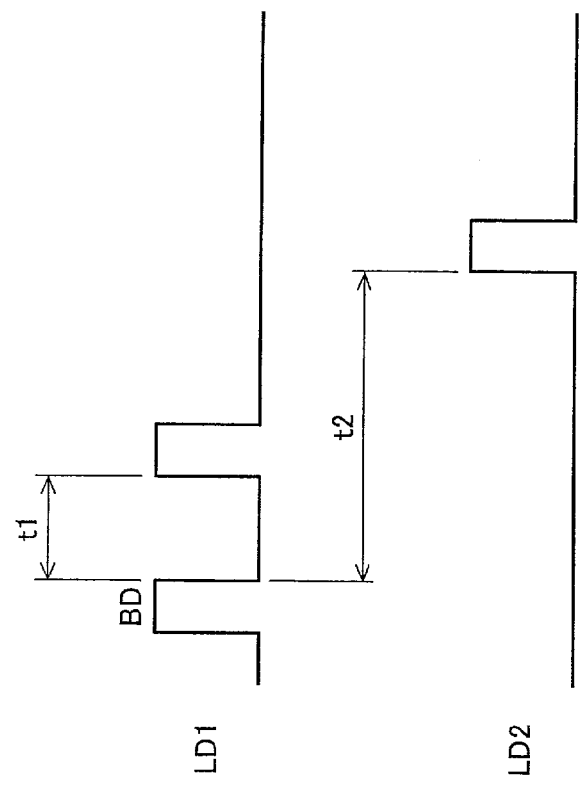
Figure 2A:
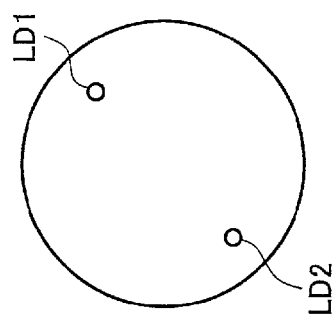

FIG. 2A and FIG. 3A are diagrams showing an arrangement of the laser elements in the low-speed machine and the high-speed machine, respectively, and show the arrangement configuration viewed from a substrate side to which the laser elements are mounted (foot side of the laser element).

In the embodiment according to the present invention, the arrangement of the laser elements is differentiated between the low-speed machine and the high-speed machine. In this example, the arrangement configuration of the laser elements LD1, LD2 in the low-speed machine and the arrangement configuration of the laser elements LD1, LD2 in the high-speed machine are horizontally symmetric. More specifically, the arrangement is made such that when the laser elements of the low-speed model and the laser elements of the high-speed model are arranged horizontally in the main scanning direction of the image forming apparatus, the arrangement of the laser elements of the low-speed model and the laser elements of the high-speed model is symmetric.

FIG. 2B shows timing of writing in the low-speed machine. The CPU of the image forming apparatus sets times t1, t2 which are from the time when the BD sensor 105 detects the laser beam of its reference using a laser beam of either one of the laser elements LD1, LD2 as a reference (LD1 in this example), until writing the image. Since the laser elements LD1, LD2 are displaced in the main scanning direction, the times t1, t2 until writing are different from each other. In this example, the time t1 until writing corresponding to the laser element LD1 is set shorter than the time t2 until writing corresponding to the laser element LD2. The times t1 and t2 until writing are stored and held in a flash ROM provided in advance in the image forming apparatus.

By performing control as shown in FIG. 2B, the writing positions on the photoreceptor image surface are aligned so that the writing part of an image becomes a clear vertical line as shown in FIG. 2C.

FIG. 3B shows timing of writing in the high-speed machine. As with the example of the low-speed machine, also in the high-speed machine, the CPU in the image forming apparatus sets times t3, t4 which are from the time when the BD sensor 105 detects the laser beam of its reference using a laser beam of either one of the laser elements LD1, LD2 as a reference, until writing an image.

In the case of the high-speed machine, since the arrangement of the laser elements LD1, LD2 is different from the low-speed machine, the times t3, t4 are also different from the times t1, t2 for the low-speed model. In this example, the time t3 until writing corresponding to the laser element LD1 is set longer than the time t4 until writing corresponding to the laser element LD2. The times t3 and t4 until writing are stored and held in a flash ROM provided in advance in the image forming apparatus.

By performing control as shown in FIG. 3B, the writing positions on the photoreceptor image surface are aligned so that the writing part of the image becomes a clear vertical line as shown in FIG. 3C.

By using the image forming apparatus for the low-speed machine with the above-described configuration, a state where exposure is performed using the laser light at a timing of the high-speed machine will be described. It is assumed that a user who intends to convert the image forming apparatus for the low-speed machine, for example, discovers the above-described skating and converts a part corresponding to the skating bit into that for the high-speed machine. In this case, from the converted substrate, the skating bit for the high-speed machine is output to the CPU. The CPU judges that the substrate is used for the high-speed machine, and reads out an operation timing for the high-speed machine from the flash ROM to perform writing control for the photoreceptor.

In this case, the time data until writing which is read out from the flash ROM by the CPU are t3 and t4 for the high speed. The arrangement configuration of the laser elements, timing of writing and the state of the image on the photoreceptor image surface, at that time, are as shown in FIGS. 4A to 4C.

Figure 4C:
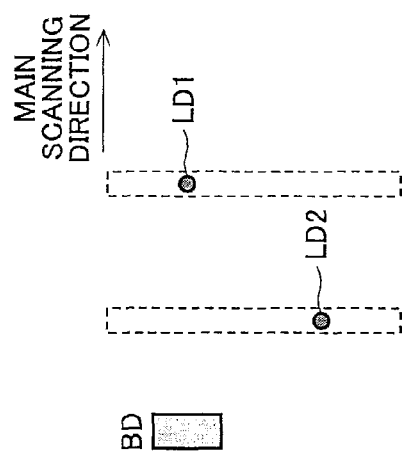
FIG. 4A to FIG. 4C are diagrams showing an arrangement configuration of laser elements, timing of writing, and a state of an image on a photoreceptor image surface when exposed at a timing of a high-speed machine with the configurations of FIG. 2A to FIG. 2C.
Figure 4B:
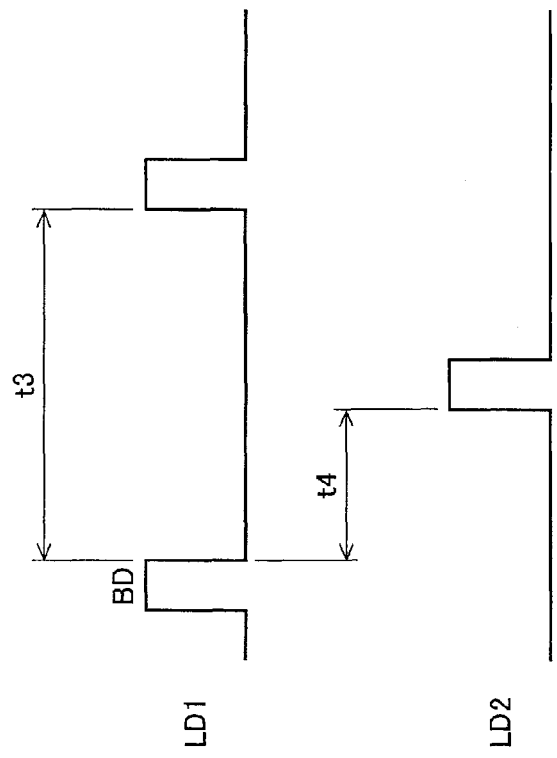
Figure 4A:
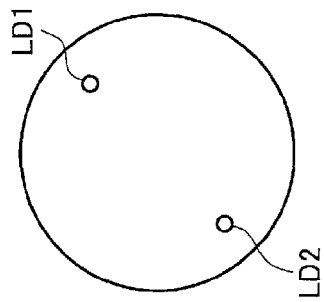

As shown in FIG. 4A, since the image forming apparatus is set for the low-speed machine, the arrangement of the laser elements LD1, LD2 is the same as the configuration shown in FIG. 2A. Then, as shown in FIG. 4B, the times t3 and t4 from the timing when the BD sensor 105 detects the laser beam of its reference until writing the image are set.

However, the times t3 and t4 are originally set in advance in response to the arrangement of the laser elements for the high-speed machine as shown in FIG. 3A to FIG. 3C, and even when the times t3 and t4 are applied to the arrangement of the laser elements for the low-speed machine, the image is not able to be written successfully.

Here, as shown in FIG. 4C, the writing start position of images between the main scanning lines corresponding to the laser elements LD1, LD2 is displaced so that the images at the start position become blurred double vertical lines. That is, the line in the sub-scanning direction becomes an n-multiple line (n: the number of beams).

In this way, by differentiating the arrangement of the laser elements LD1, LD2 between the model for the low-speed machine and the model for the high-speed machine so as to be horizontally symmetric in the image forming apparatus provided with the scanning optical system by the multilaser beam, in the case where the conversion of the speed range is performed, quality of the image is deteriorated. Thereby, in a case where the skating bit is discovered, conversion of the speed range is not able to be performed easily.

FIG. 5A to FIG. 5C and FIG. 6A to FIG. 6C are diagrams illustrating another mounting configuration example of laser elements, timing of writing at that time, and behavior of an image surface in the image forming apparatus according to the present invention.

Figure 6C:
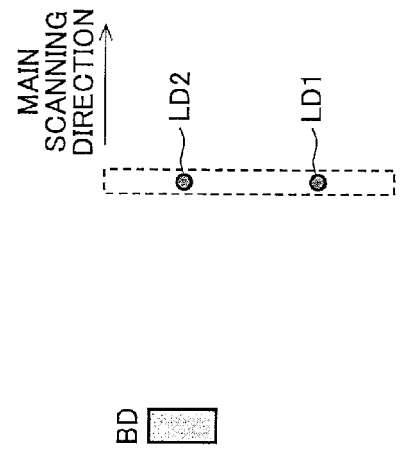
FIG. 6A to FIG. 6C are another diagrams illustrating another mounting configuration example of laser elements, timing of writing at that time, and behavior of an image surface in the image forming apparatus according to the present invention.
Figure 6B:
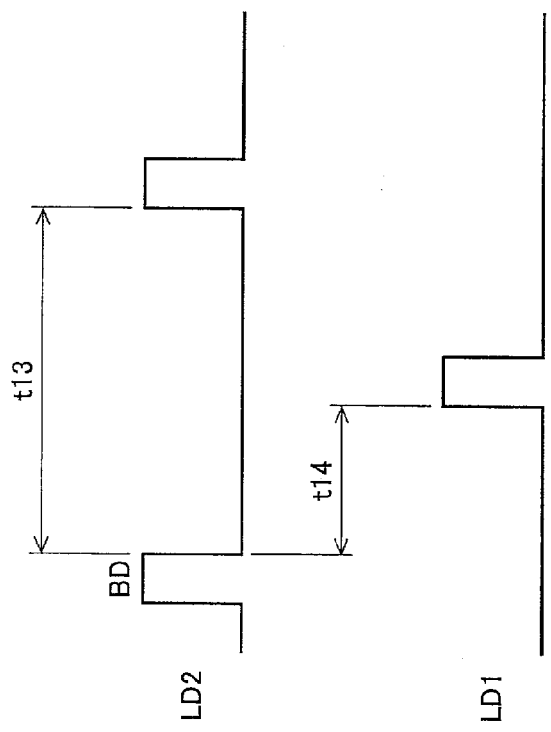
Figure 6A:
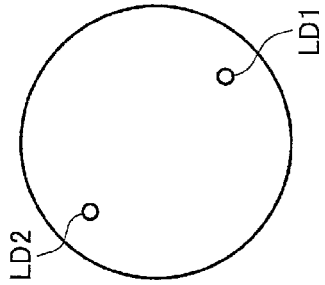

FIG. 5A and FIG. 6A are diagrams showing the arrangement of the laser elements in the low-speed machine and the high-speed machine, respectively, and show the arrangement configuration viewed from a substrate side to which the laser elements are mounted (foot side of the laser element). In this example, the arrangement configuration of the laser elements LD1, LD2 in the low-speed machine and the arrangement configuration of the laser elements LD1, LD2 in the high-speed machine are vertically symmetric. More specifically, the arrangement is made such that when the laser elements of the low-speed model and the laser elements of the high-speed model are arranged vertically in the sub-scanning direction of the image forming apparatus, the arrangement of the laser elements of the low-speed model and the laser elements of the high-speed model is vertically symmetric. In the case of this example, in the main scanning direction, the LDls for the low speed and for the high speed are displaced further toward the traveling direction of the main scanning. However, in the sub-scanning direction, the order of the LD1 and the LD2 are inverted between the low-speed machine and the high-speed machine.

FIG. 5B shows timing of writing in the low-speed machine. The CPU in the image forming apparatus sets times t11, t12 which are from the time when the BD sensor 105 detects the laser beam of its reference using a laser beam of either one of the laser elements LD1, LD2 as a reference (LD1 in this example), until writing the image. Since the laser elements LD1, LD2 are displaced in the main scanning direction, the times t11, t12 until writing are different from each other. In this example, the time t11 until writing corresponding to the laser element LD1 is set shorter than the time t12 until writing corresponding to the laser element LD2. The times t11, t12 until writing are stored and held in a flash ROM provided in advance in the image forming apparatus.

By performing control as shown in FIG. 5B, the writing positions on the photoreceptor image surface are aligned so that the writing part of an image becomes a clear vertical line as shown in FIG. 5C.

FIG. 6B shows timing of writing in the high-speed machine. As with the example of the low-speed machine, also in the high-speed machine, the CPU in the image forming apparatus sets times t13, t14 which are from the time when the BD sensor 105 detects the laser beam of its reference using the laser beam of either one of the laser elements LD1, LD2 as a reference, until writing the image.

In the case of the high-speed machine, since the arrangement of the laser elements LD1, LD2 is different from the arrangement of the low-speed machine, the times t13, t14 are also different from the times t11, t12 for the low-speed machine. In this example, the time t14 until writing corresponding to the laser element LD1 is set shorter than the time t13 until writing corresponding to the laser element LD2. The times t13, t14 until writing are stored and held in a flash ROM provided in advance in the image forming apparatus.

By performing control as shown in FIG. 6B, the writing positions on the photoreceptor image surface are aligned so that the writing part of the image becomes a clear vertical line as shown in FIG. 6C.

A state where exposure is performed using the laser light at a timing of the high-speed machine using the image forming apparatus for the low-speed machine with the above-described configuration will be described. It is assumed that a user who intends to convert the image forming apparatus for the low-speed machine, for example, discovers the above-described skating and converts a part corresponding to the skating bit into that for the high-speed machine, so that the CPU performs writing control for the photoreceptor at the operation timing for the high-speed machine.

In this case, the time data until writing which is read out from the flash ROM by the CPU are t13 and t14 for the high-speed machine. The arrangement configuration of the laser elements at this time, timing of writing and the state of the image on the photoreceptor image surface are as shown in FIG. 7.

As shown in FIG. 7A, since the image forming apparatus is set for the low-speed machine, the arrangement of the laser elements LD1, LD2 is the same as the configuration shown in FIG. 5A. Then, as shown in FIG. 7B, the times t13, t14 from the time when the BD sensor 105 detects the laser beam of its reference until writing an image are set.

At this time, although there is no problem using the time t13 for the laser element LD1 and using the time t14 for the laser element LD2, the arrangement order of the laser elements LD1, LD2 in the sub-scanning direction is different between the low-speed machine and the high-speed machine. Accordingly, the light beams of the light elements LD1 and the LD2 are written on the photoreceptor image surface with positions switched with each other. Specifically, as shown in FIG. 6C, the order in the sub-scanning direction of the high-speed machine should be the order of LD2 to LD1 from above, however, in FIG. 7C in which the low-speed machine is converted to the high-speed machine, the order is from LD1 to LD2 from above in the sub-scanning direction. Thereby, it is impossible to write an image which is originally intended to be obtained on the image surface. That is, the data in the sub-scanning direction is counterchanged in a unit of the number of beams.

In this way, since, in the image forming apparatus provided with the scanning optical system by the multilaser beam, the main scanning lines of an image is replaced in the sub-scanning direction when the conversion of the speed range is performed by differentiating the arrangement of the laser elements LD1, LD2 between the model for the low-speed machine and the model for the high-speed machine so as to be vertically symmetric, the image can not be formed successfully. Thereby, even in a case where the skating bit is discovered, conversion of the speed range is not able to be performed easily.

FIG. 8A to FIG. 8C and FIG. 9A to FIG. 9C are diagrams illustrating still another mounting configuration example of laser elements, timing of writing at that time, and behavior of an image surface in the image forming apparatus according to the present invention.

Figure 8C:
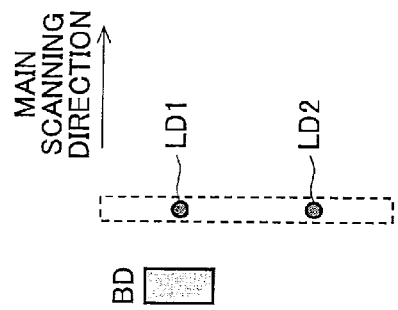
FIG. 8A to FIG. 8C are diagrams illustrating still another mounting configuration example of laser elements, timing of writing at that time, and behavior of an image surface in the image forming apparatus according to the present invention.
Figure 8B:
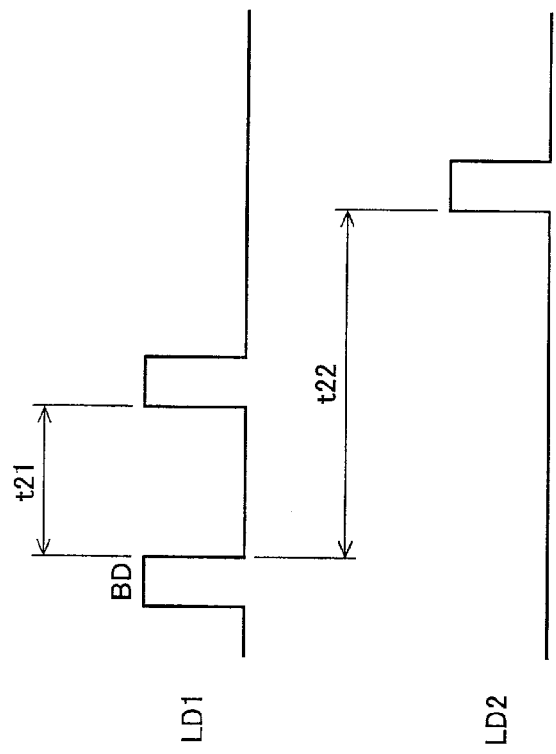
Figure 8A:
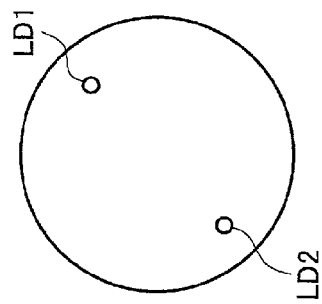
Figure 9C:
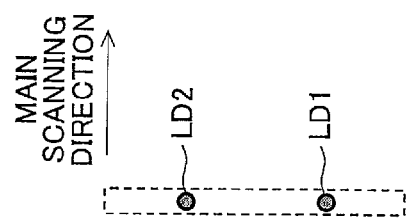
FIG. 9A to FIG. 9C are another diagrams illustrating still another mounting configuration example of laser elements, timing of writing at that time, and behavior of an image surface in the image forming apparatus according to the present invention.
Figure 9B:
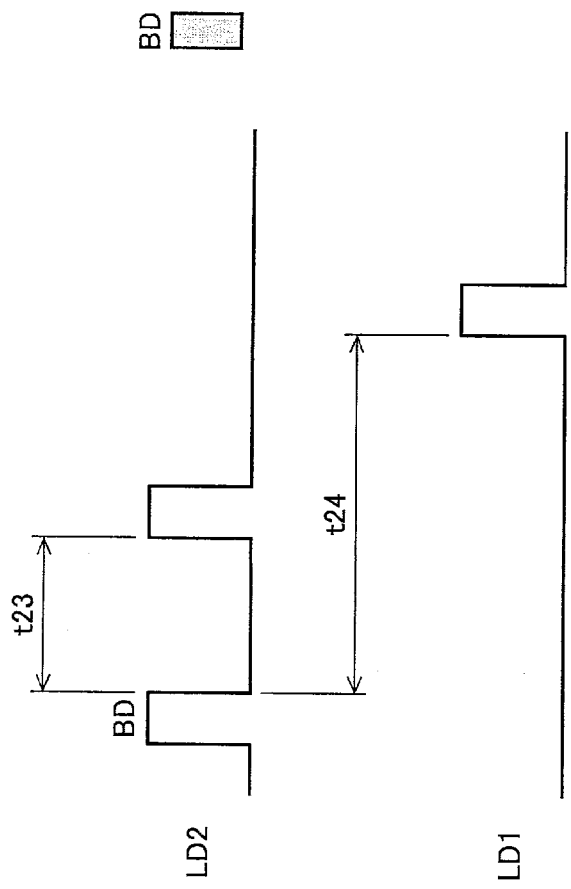
Figure 9A:
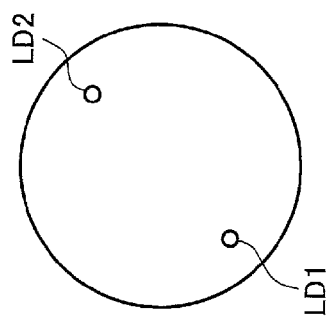

FIG. 8A and FIG. 9A are diagrams showing the arrangement of the laser elements in the low-speed machine and the high-speed machine, respectively, and show the arrangement configuration viewed from a substrate side on which the laser elements are mounted (foot side of the laser element). In this example, the arrangement of the laser elements LD1, LD2 in the low-speed machine and the arrangement of the laser elements LD1, LD2 in the high-speed machine correspond to each other when rotated 180° around the center point of the arrangement region of the laser elements as a rotation center. In this example, in both the main scanning direction and the sub-scanning direction, the order of the LD1 and the LD2 are reversed between the low-speed machine and the high-speed machine.

FIG. 8B shows timing of writing in the low-speed machine. The CPU in the image forming apparatus sets times t21, t22 which are from the time when the BD sensor 105 detects the laser beam of its reference using a laser beam of either one of the laser elements LD1, LD2 as a reference (LD1 in this example), until writing the image. Since the laser elements LD1, LD2 are displaced in the main scanning direction, the times t21, t22 until writing are different from each other. In this example, the time t21 until writing corresponding to the laser element LD1 is set shorter than the time t21 until writing corresponding to the laser element LD2. The times t21 and t22 until writing are stored and held in a flash ROM provided in advance in the image forming apparatus.

By performing control as shown in FIG. 8B, as shown in FIG. 8C, the writing positions on the photoreceptor image surface are aligned so that the writing part of the image becomes a clear vertical line.

FIG. 9B shows timing of writing in the high-speed machine. As with the example of the low-speed machine, also in the high-speed machine, the CPU in the image forming apparatus sets times t23, t24 from the time when the ED sensor 105 detects the laser beam of its reference using a laser beam of either one of the laser elements LD1, LD2 as a reference until writing the image.

In the case of the high-speed machine, since the arrangement of the laser elements LD1, LD2 is different from the arrangement of the low-speed machine, the times t23, t24 are also different from the times t21, t22 for the low-speed machine. In this example, the time t23 until writing corresponding to the laser element LD2 is set shorter than the time t24 until writing corresponding to the laser element LD1. The times t23, t24 until writing are stored and held in a flash ROM provided in advance in the image forming apparatus.

By performing control as shown in FIG. 9B, the writing positions on the photoreceptor image surface are aligned so that the writing part of the image becomes a clear vertical line as shown in FIG. 9C.

A state where exposure is performed by the laser light at a timing of the high-speed machine using the image forming apparatus for the low-speed machine with the above-described configuration will be described. It is assumed that a user who intends to convert the image forming apparatus for the low-speed machine, for example, discovers the above-described skating and converts the part corresponding to the skating bit into that for the high-speed machine, so that the CPU performs writing control for the photoreceptor at an operation timing for the high-speed machine.

Figure 10C:
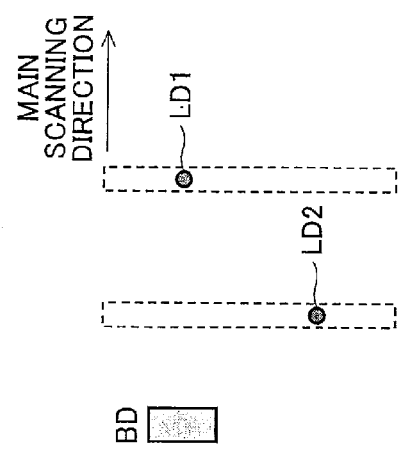
FIG. 10A to FIG. 10C are diagrams showing an arrangement configuration of laser elements, timing of writing, and a state of an image on a photoreceptor image surface when exposed at a timing of a high-speed machine with the configurations of FIG. 8A to FIG. 8C.

In this case, the time data until writing which is read out from the flash ROM by the CPU are t23 and t24 for the high speed. The arrangement configuration of the laser elements, timing of writing and the state of the image on the photoreceptor image surface at this time are as shown in FIG. 10A to FIG. 10O.

Figure 10B:
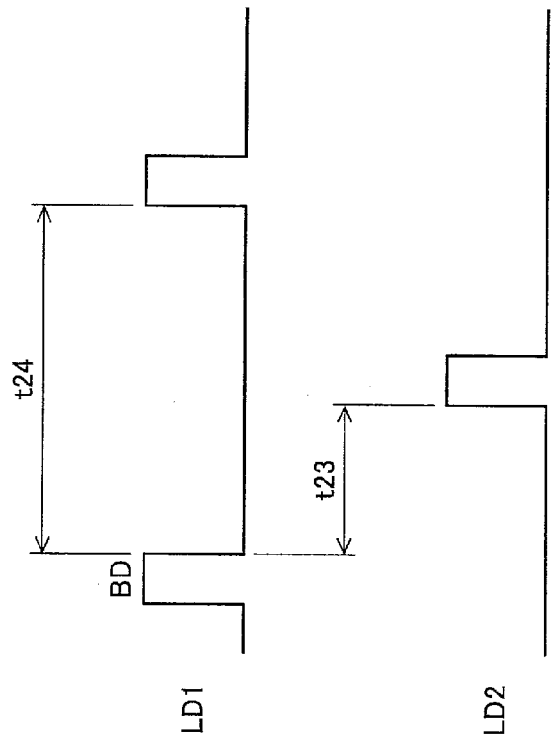
Figure 10A:
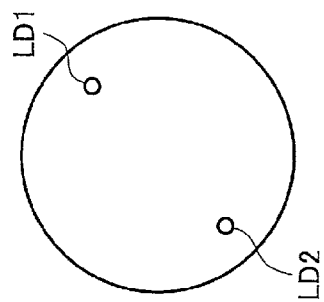

As shown in FIG. 10A, since the image forming apparatus is set for the low-speed machine, the arrangement of the laser elements LD1, LD2 are the same as the configuration shown in FIG. 8A. Then, as shown in FIG. 10B, the times t23, t24 until writing from the time when the BD sensor 105 detects the laser beam of its reference until writing an image are set.

At this time, the times t23 and t24 are originally set in advance in response to the arrangement of the laser elements for the high-speed machine as shown in FIG. 9A to FIG. 9C, and even when the times t23 and t24 are applied to the arrangement of the laser elements for the low-speed machine, the image is not able to be written successfully. That is, as shown in FIG. 10O, the writing start position of the images between the main scanning lines corresponding to the laser elements LD1, LD2 is displaced so that the images at the start position become blurred double vertical lines. That is, the line in the sub-scanning direction becomes the n-multiple line (n: the number of beams). Moreover, at the same time, in this example, the arrangement of the laser elements LD1, LD2 between the low-speed machine and the high-speed machine is reversed to each other. Accordingly, the light beams of the light elements LD1 and the LD2 are written on the photoreceptor image surface with positions switched wish each other in the sub-scanning direction. That is, the data in the sub-scanning direction is counterchanged in a unit of the number of beams.

In this manner, since, in the image forming apparatus provided with the scanning optical system by the multilaser beam, the line becomes n-multiple line and the main scanning line of an image is replaced in the sub-scanning direction when the conversion of the speed range is performed by arranging the laser elements LD1, LD2 between the model for the low-speed machine and the model for the high-speed machine so as to correspond to each other when rotated 180° around the center point of the arrangement region of the laser elements, the image can not be formed successfully. Thereby, even in a case where the skating bit is discovered, conversion of the speed range is not able to be performed easily.

Figure 11:
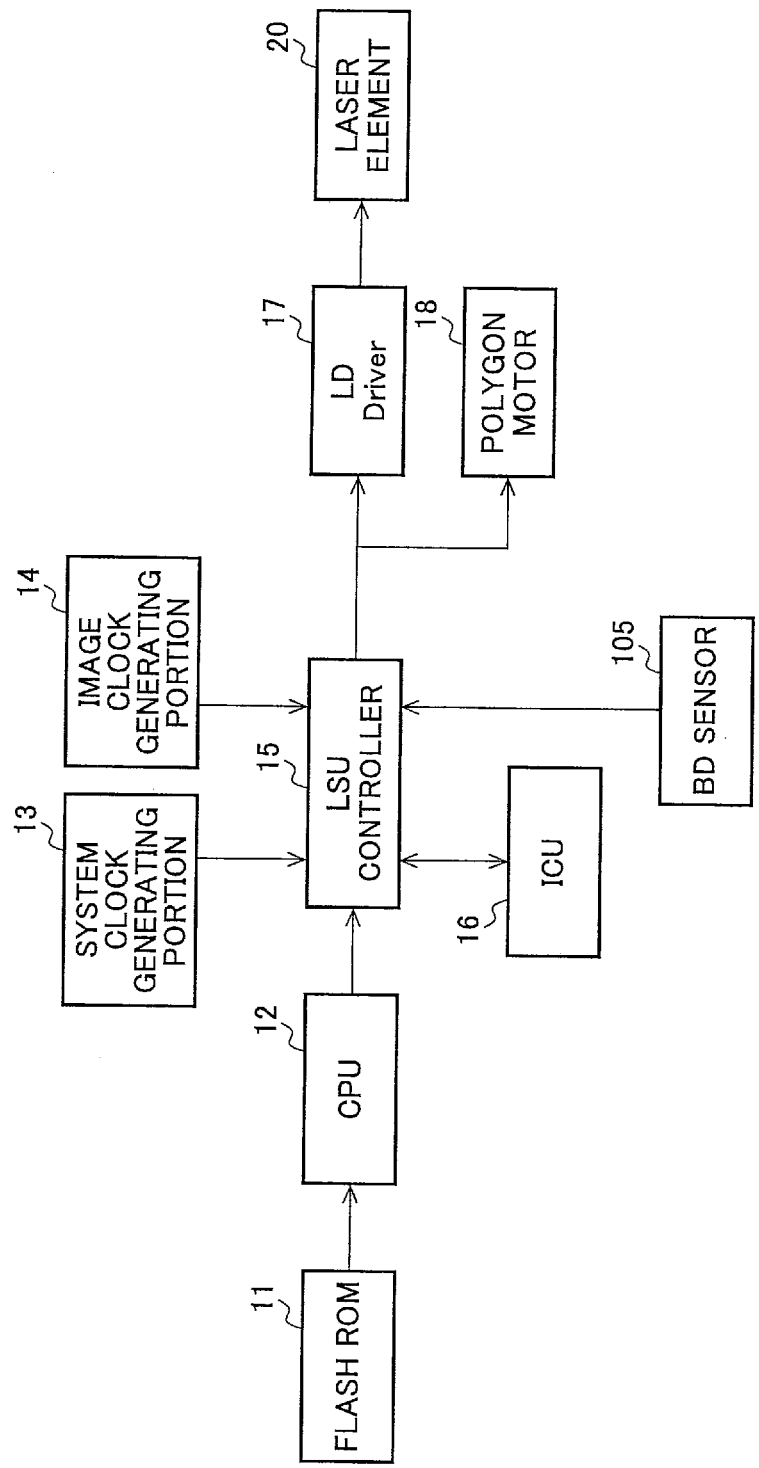
FIG. 11 is a block diagram for illustrating a configuration example of the image forming apparatus according to the present invention.

FIG. 11 is a block diagram for illustrating a configuration example of the image forming apparatus according to the present invention.

A CPU 12 controls each block of the image forming apparatus. In a flash ROM 11, software for controlling such as timing of writing of a laser is stored, and information of the timing of writing of a laser and the like are stored. The CPU 12 activates the software to obtain the information of the timing of writing of a laser and the like so as to control each block's action.

An ICU (Image Control Unit) 16 applies predetermined image processing for image data received from an externally-connected device and the like to store in an internal image memory.

An LSU (Laser Scanning Unit) controller 15 inputs an image data signal output from an image memory or the like of an ICU 16 of the image forming apparatus, and transmits the signal to a laser driver circuit (LD Driver) 17 in accordance with the timing of writing transmitted from the CPU 12 for controlling a laser element 20 to excite. Moreover, the LSU controller 15 controls a reference rotation operation of a polygon motor 18 for driving a polygon mirror so as to conform to a specification in the main scanning direction of the image forming apparatus. Furthermore, the BD sensor 105 for detecting a start position of writing in the main scanning direction receives a light beam so as to detect a timing of the main scanning, and in the case of an error, outputs an error signal to the CPU 12. The LSU controller 15 is comprised of an ASIC (Application Specific Intergated Circuit).

A system clock generated in a system clock generating portion 13 and an image clock generated in an image clock generating portion 14 are input in the LSU controller 15. The image clock becomes a reference for generating image data which is supplied to the laser driver circuit 17. Furthermore, the system clock is used to generate a reference signal for controlling a polygon mirror and the like.

In one embodiment according to the present invention, information of the timing of writing for the high-speed machine and the low-speed machine, namely, information related to time from when a laser beam is detected by the BD sensor 105 until when writing of an image is started on an image surface of a photoreceptor is stored in the flash ROM 11 in advance. Furthermore, software to control the timing of writing is stored in the flash ROM 11.

The CPU 12 obtains a corresponding timing of writing from the flash ROM based on a skating bit obtained from each circuit substrate, and gives an instruction to the LSU controller 15 together with image data obtained from the ICU 16. The LSU controller 15 controls the laser driving by the laser driver circuit 17 in accordance with this timing of writing. The skating bit is determined according to the speed range of the model, as described above.

In this manner, the CPU 12 uses software stored in the flash ROM 11 to obtain the timing information and the like in accordance with the speed range to give an instruction to the LSU controller 15. Thereby, with the change of the model specifications (low-speed machine, high-speed machine), a register value instructed to the LSU controller changes so that a timing of exciting the laser changes.

Even when a third person who intends to convert the speed range of the image forming apparatus set in the low-speed machine, for example, converts the skating bit thereof into that for the high-speed machine, the arrangement of the laser elements between the low-speed machine and the high-speed machine is different from each other, and thus an appropriate image is not able to be obtained. Further, even when the third person intends to obtain the timing information from the register value of the LSU controller 15, there are a number of register values (some hundreds thereof, for example) instructed to the LSU controller 15 from the CPU 12, and therefore, it is difficult to decode the register value of the LSU controller 15 to easily decode the timing information.

Figure 12:
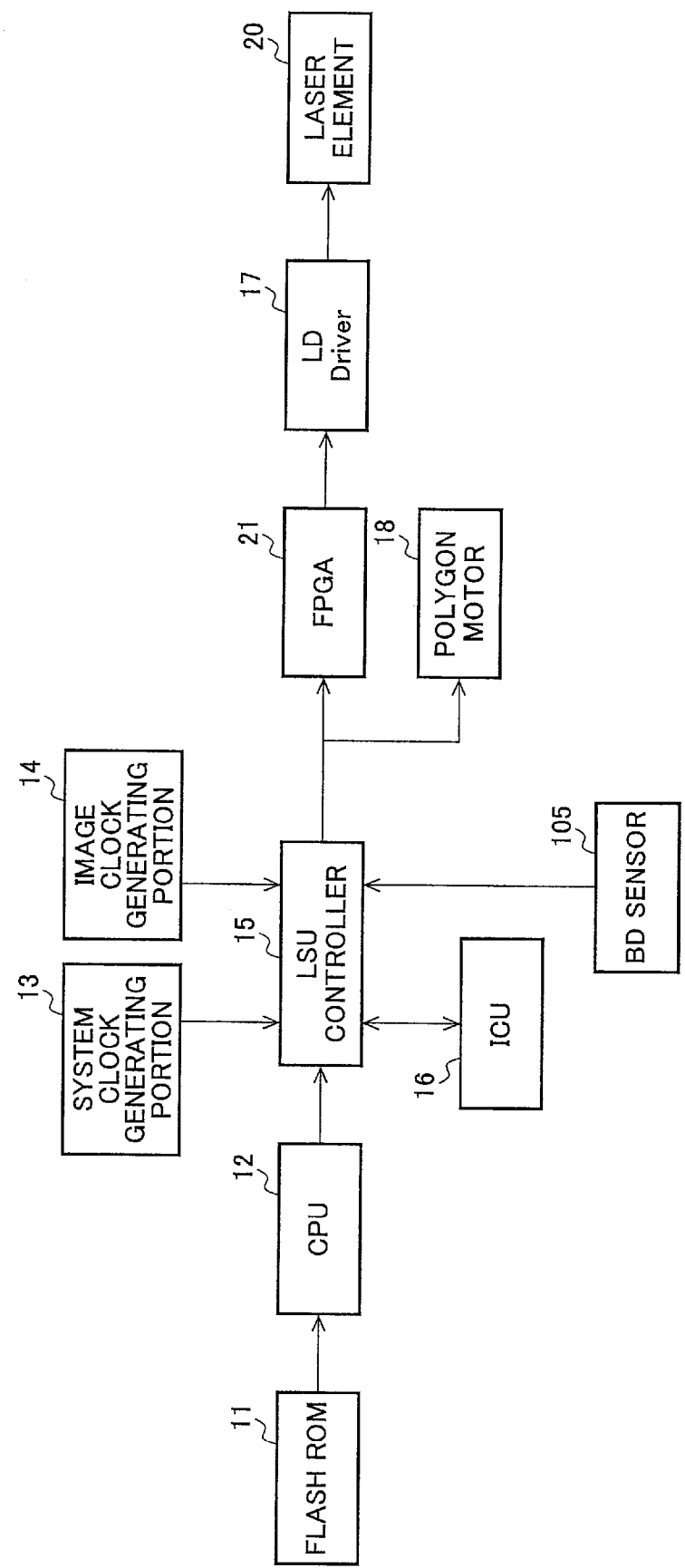
FIG. 12 is a block diagram for illustrating another configuration example of the image forming apparatus according to the present invention.

FIG. 12 is a block diagram for illustrating another configuration example of the image forming apparatus according to the present invention.

In the configuration of this example, an FPGA (Field Programmable Gate Array) 21 is provided to adjust the timing of writing. Accordingly, the FPGA 21 controls the timing of writing according to the skating bit from the substrate without storing the timing of writing information in the flash ROM 11. The other configuration elements in FIG. 12 are the same as FIG. 11, therefore the repeated description is omitted.

Figure 13:
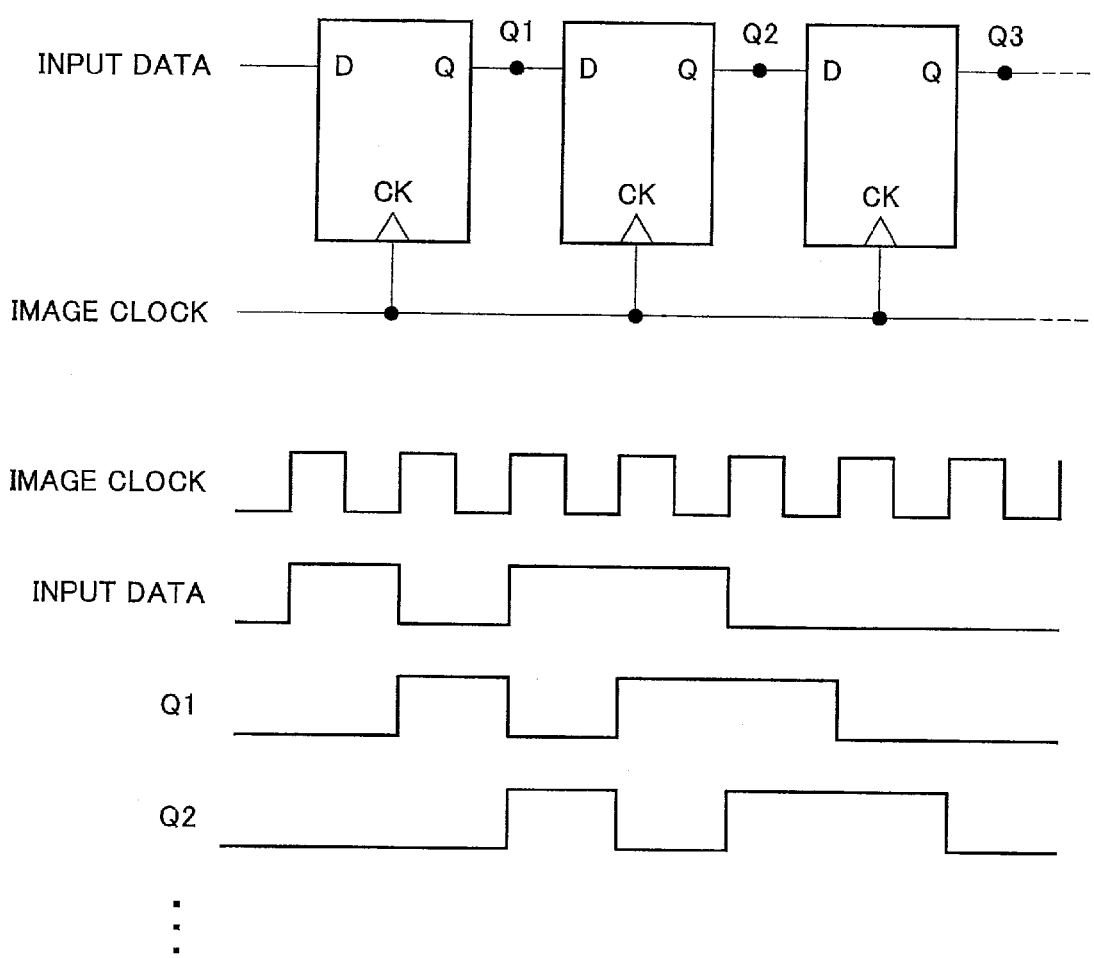
FIG. 13 is a block diagram illustrating a configuration of a delay circuit applied to an FPGA of FIG. 12 and a state where an image clock is delayed.

In the FPGA 21, a delay circuit such as a shift register is provided. In FIG. 13, the configuration of the delay circuit and a state where an image clock is delayed will be described. The image clock is a basic clock for each dot which excites the laser element, and advances input data which is input to the shift register by the image clock signal to shift a data sequence.

The input data is data according to a recorded image and shows exciting and unexciting of the laser elements by HIGH and LOW. Then, output of input data Q1, Q2 . . . including a delay amount in which the input data is delayed by assembling the shift registers therein in multiple stages is performed. In the laser driver circuit 17, the emission of light of the laser elements according to the input data Q1, Q2 including a delay amount is controlled so that the writing control as with the above-described case where the writing-information is stored in the flash ROM is able to be performed.

In the case of this example, since the timing of writing is controlled by the FPGA 21, even when the skating bit is converted into that for the high-speed machine, the arrangement of the laser elements LD1, LD2 and the timing of writing of the FPGA 21 remain as those for the low-speed, therefore, a desired image is not able to be obtained. Furthermore, even though it is revealed that the timing of writing is adjusted by the FPGA 21, as long as a package of a BGA (Ball Grid Array) is employed, it is impossible for a third person to easily relabel the FPGA.

As described above, according to the present invention, it is possible to provide an image forming apparatus in which arrangement of laser elements emitting a multibeam is differentiated between a low-speed machine and a high-speed machine so that, when conversion of a speed range is performed, distortion of an image is caused, and thus causing the conversion of the speed range not able to be performed substantively.

The invention claimed is:

1. An image forming apparatus comprising:
a plurality of laser elements and a scanning optical system which scans a photoreceptor by a laser beam emitted from the laser elements, wherein
the image forming apparatus has a speed range showing image forming capability per unit time that is determined in advance, and is settable to either a model set at a relatively low-speed range or a model set at a relatively high-speed range, and
arrangement of the laser elements of the low-speed model and arrangement of the laser elements of the high-speed model are differentiated from each other, wherein
if the laser elements of the low-speed model and the laser elements of the high-speed model are arranged horizontally in a main scanning direction of the image forming apparatus, the arrangement of the laser elements of the low-speed model and the laser elements of the high-speed model is horizontally symmetric.

2. The image forming apparatus as defined in claim 1, wherein
timing of writing of writing image data on the photoreceptor by scanning the photoreceptor by a laser beam is adjusted by software.

3. The image forming apparatus as defined in claim 1, wherein
timing of writing of writing image data on the photoreceptor by scanning the photoreceptor by a laser beam is adjusted by a field programmable gate array.

4. An image forming apparatus comprising:
a plurality of laser elements and a scanning optical system which scans a photoreceptor by a laser beam emitted from the laser elements, wherein
the image forming apparatus has a speed range showing image forming capability per unit time that is determined in advance, and is settable to either a model set at a relatively low-speed range or a model set at a relatively high-speed range, and
arrangement of the laser elements of the low-speed model and arrangement of the laser elements of the high-speed model are differentiated from each other, wherein
if the laser elements of the low-speed model and the laser elements of the high-speed model are arranged vertically in a sub-scanning direction of the image forming apparatus, the arrangement of the laser elements of the low-speed model and the laser elements of the high-speed model is vertically symmetric.

5. The image forming apparatus as defined in claim 4, wherein
timing of writing of writing image data on the photoreceptor by scanning the photoreceptor by a laser beam is adjusted by software.

6. The image forming apparatus as defined in claim 4, wherein
timing of writing of writing image data on the photoreceptor by scanning the photoreceptor by a laser beam is adjusted by a field programmable gate array.

7. An image forming apparatus comprising:
a plurality of laser elements and a scanning optical system which scans a photoreceptor by a laser beam emitted from the laser elements, wherein
the image forming apparatus has a speed range showing image forming capability per unit time that is determined in advance, and is settable to either a model set at a relatively low-speed range or a model set at a relative high-speed range, and
arrangement of the laser elements of the low-speed model and arrangement of the laser elements of the high-speed model are differentiated from each other, wherein
arrangement positions of the laser elements of either one of the low-speed model or the high-speed model corresponds to positions where the laser elements of the other model are rotated 180° around a center point of an arrangement region of the laser elements as a rotation center.

8. The image forming apparatus as defined in claim 7, wherein
timing of writing of writing image data on the photoreceptor by scanning the photoreceptor by a laser beam is adjusted by software.

9. The image forming apparatus as defined in claim 7, wherein
timing of writing of writing image data on the photoreceptor by scanning the photoreceptor by a laser beam is adjusted by a field programmable gate array.

* * * * *